United States Patent [19]

Tremblay

[11] 3,773,986

[45] Nov. 20, 1973

[54] TELEPHONE LINE TEST ISOLATION APPARATUS

[75] Inventor: Hubert J. Tremblay, Roselle, Ill.

[73] Assignee: Communication Systems Corporation, Morton Grove, Ill.

[22] Filed: Dec. 13, 1971

[21] Appl. No.: 207,465

[52] U.S. Cl. .............................................. 179/175.3
[51] Int. Cl. .............................................. H04b 3/46
[58] Field of Search .................................. 179/175.3; 340/167 A; 328/111, 115; 307/234

[56] References Cited

UNITED STATES PATENTS

| | | | |
|---|---|---|---|
| 3,636,280 | 1/1972 | Wetzel | 179/175.3 |
| 3,417,210 | 12/1968 | Chapin | 179/175.3 |
| 3,241,074 | 3/1966 | Baude | 328/111 |

*Primary Examiner*—Kathleen H. Claffy
*Assistant Examiner*—Alan Faber
*Attorney*—Jack C. Berenzweig

[57] ABSTRACT

There is disclosed an apparatus, which is located at a subscriber equipment installation, for remotely disconnecting the subscriber equipment from the subscriber line and its associated central office equipment to facilitate testing of the central office equipment. The apparatus comprises a means for remotely applying a signal of preselected magnitude from the central office to the apparatus, a circuit responsive to the signal for opening the connection between the subscriber equipment and the subscriber line, thereby remotely isolating the subscriber equipment from the central office equipment, and a circuit for automatically reconnecting the subscriber equipment to the subscriber line after a preselected time interval.

5 Claims, 3 Drawing Figures

FIG. 1

TELEPHONE LINE TEST ISOLATION APPARATUS

BACKGROUND OF THE INVENTION

The present invention relates to telephone testing equipment and more particularly, to an apparatus which may be used by a person located in the central office to remotely disconnect the subscriber equipment from the central office equipment and then automatically reconnect the subscriber equipment to the central office equipment.

Throughout the years, the telephone industry has made every effort to provide reliable service and to locate and correct any condition which disrupts service. When there is a report of trouble on a telephone cable line, the telephone company works diligently to determine the nature and cause of the trouble and to initiate corrective action as promptly as possible. Most telephone central offices are equipped with testboard facilities which enable the maintenance personnel located in the central office to identify the trouble conditions on the telephone cable line. Such testboards employ a power source which may be connected to the line in a variety of ways in conjunction with certain metering circuits to make line tests. However, frequently, in order to identify and isolate trouble condition, it is necessary to disconnect the subscriber equipnent from the cable line so as to be able to test the telephone cable pair.

Currently, it is necessary for a repair man to leave the central office and travel great distances to the subscriber location in order to disconnect the subscriber equipment from both the telephone cable line and from the central office equipment. With the current trend towards longer subscriber loops and the growing use of centralized service centers, the amount of time spent in traveling to remote subscriber locations adversely affects maintenance costs. The problem is compounded by the fact that all too often, the equipment fault lies within the subscriber-owned equipment and not within the telephone company facilities and, therefore, is a means were provided whereby subscriber equipment could easily be disconnected without traveling from the central office, maintenance costs could be greatly reduced.

The general purpose of this invention is to provide an apparatus for disconnecting, by remote means, the subscriber equipment from the central office equipment, thus sparing the costly journey to the subscriber equipment itself by a repair man. To attain this, the present invention contemplates a unique apparatus which is installed on the subscriber equipment premises and is located in the subscriber loop between the central office equiment and the subscriber equipment. The present invention provides a means for remotely applying a signal of preselected magnitude from the central office equipment to the apparatus. A switch means, located within the apparatus, is connected in the subscriber cable line between the subscriber equipment and the central office equipment. The switch means is controlled by a circuit which senses the magnitude of the signal being applied and is adapted to open the switch means, thereby disconnecting the subscriber equipment from the subscriber line or disconnecting the subscriber equipment from the subscriber line and substituting a preselected fixed termination when the signal is of a preselected magnitude. Lastly, a circuit is provided for automatically closing the switch again after a preselected time interval, thus re-establishing the connection of the subscriber equipment to the central office equipment.

It is, therefore, an object of the present invention to provide an apparatus for remotely disconnecting the subscriber equipment from its associated central office equipment.

Another object is to provide an apparatus which enables the testing of the telephone line solely from the central office without the need for a repair man to physically disconnect the subscriber equipment at the subscriber end of the line.

A further object is to provide an apparatus which can supply a fixed termination to the telephone line or cable pair for testing purposes.

Still another object is to provide an apparatus which can disconnect the subscriber equipment from the telephone line and then automatically reconnect the subscriber equipment after a preselected time interval.

Yet another object is the provision of an apparatus used which presents a very high impedance to the telephone line and which does not affect normal telephone service in any way.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
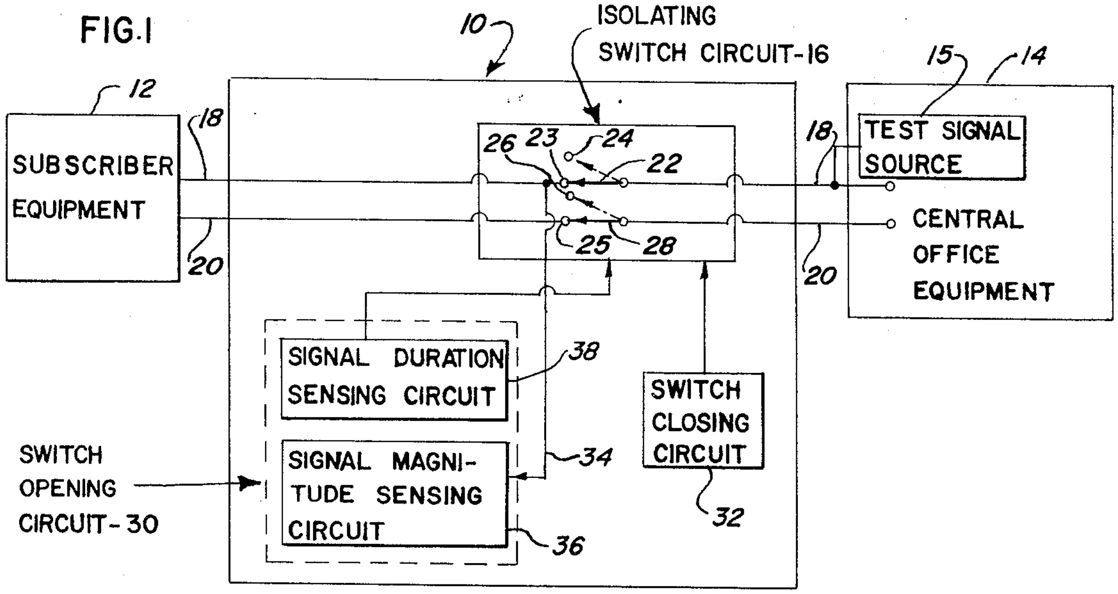
FIG. 1 is a block diagram of a preferred embodiment of the invention.

Referring now to the drawings wherein like reference characters designate like or corresponding parts throughout the several views, there is shown in FIG. 1, which illustrates preferred embodiment of the invention, a telephone line test isolation apparatus 10 which is connected in the subscriber loop between the subscriber equipment 12 and the central office equipment 14. The line test isolation apparatus 10 is designed to be installed preferably on the subscriber's premises. The line test isolation apparatus 10 broadly comprises an isolating switch circuit 16 which is connected into the subscriber cables 18 and 20 between the subscriber equipment 12 and the central office equipment 14. As will be explained in more detail below with reference to FIG. 2, the isolating switch circuit 16 comprises a pair of switches 22 and 28 which are controlled by associated circuitry shown in detail in FIG. 2. Switch 22 is operable between its normally closed contact 23 and its normally open contact 24, while switch 28 is operable between its normally closed contact 25 and its normally open contact 26. When the switches 22 and 28 are in their normally closed position in contact with contacts 23 and 25, the central office equipment 14 is directly connected to the subscriber equipment 12 through the isolating switch circuit 16 in the subscriber lines 18 and 20. The line test isolation apparatus 10 is designed to present a very high impedance to the subscriber cables 18 and 20 and, therefore, does not affect the normal telephone service in any way.

The line test isolation apparatus 10 further comprises a switch opening circuit 30 and a switch closing circuit 32. The switch opening circuit 30 is designed to be actuated by a repair man located in the central office. Most telephone central offices are equipped with testboard facilities which enable maintenance personnel to identify trouble conditions on the line. Such testboards normally employ a power source 15 which is connected to one or both of the subscriber lines 18 and 20. This power source is normally 75 or 150 volts but any power source could be utilized. Typically, to test the subscriber cables, it would be necessary for a telephone repair man to go to the subscriber and disconnect the subscriber equipment 12 from the subscriber cables 18 and 20. At this point, the test signal source 15 would then be transmitted over either the subscriber cables 18 or 20 towards the open termination of the cables due to the removal of the subscriber equipment 12. By utilizing line test isolation apparatus 10 of the present invention, the need for the physical removal of the subscriber equipment by a telephone repair man located at the subscriber equipment may be eliminated.

To attain this, the test signal source 15 would be transmitted over either the subscriber cable 18 or the subscriber cable 20 by a repair man located at the central office. Within the line test isolation apparatus 10 a conductor 34 is provided over which passes the test signal which has been transmitted from the central office. This test signal on the conductor 34 goes to the switch opening circuit and, if it is of the proper magnitude, as sensed by a signal magnitude sensing circuit 36, and if it is of a proper time duration as sensed by a signal duration sensing circuit 38, switches 22 and 28 will be actuated thereby disconnecting the subscriber equipment 12 from the central office equipment 14.

Figure 2:
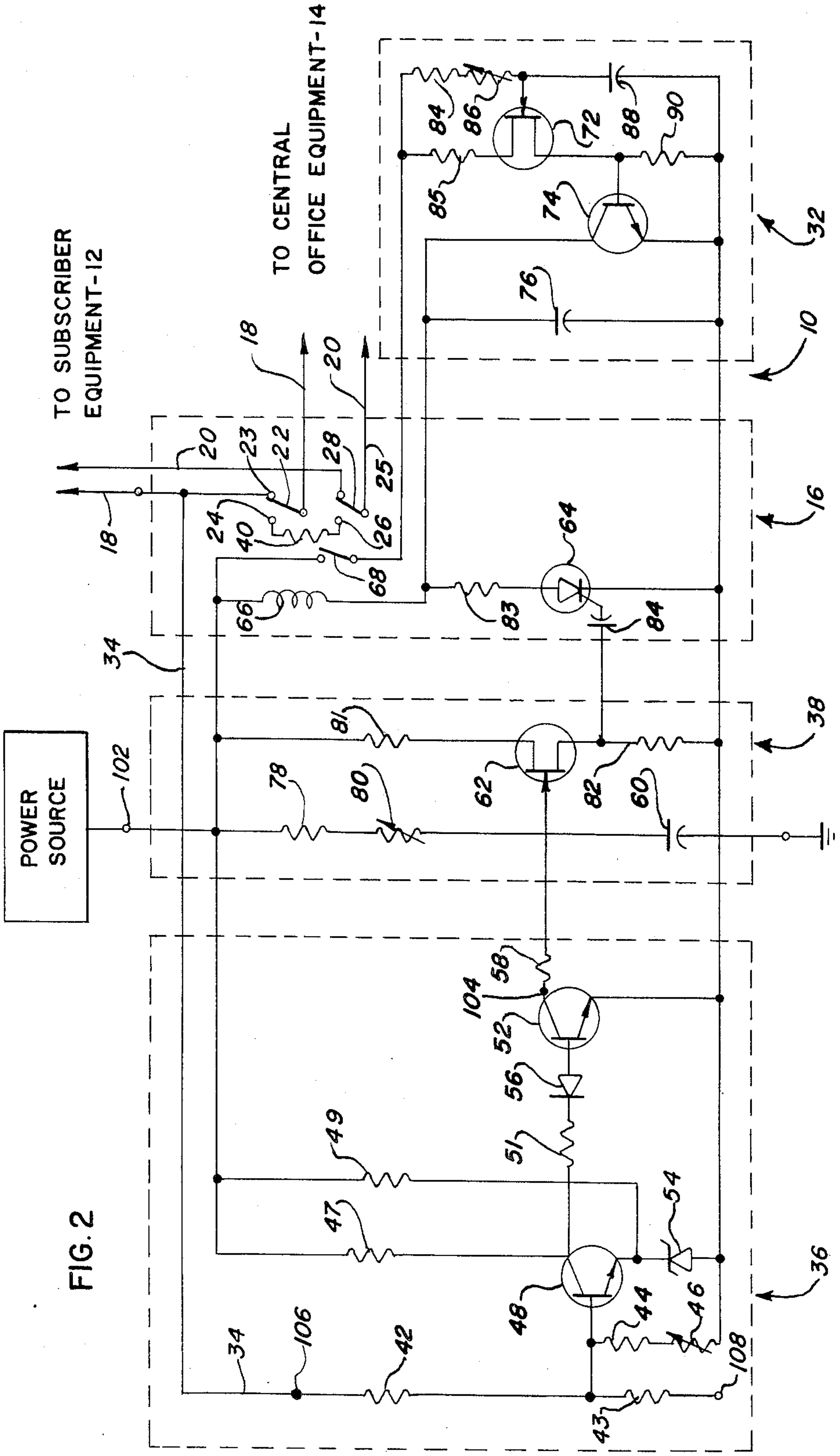
FIG. 2 is a schematic diagram of the invention shown in FIG. 1.
Figure 3:
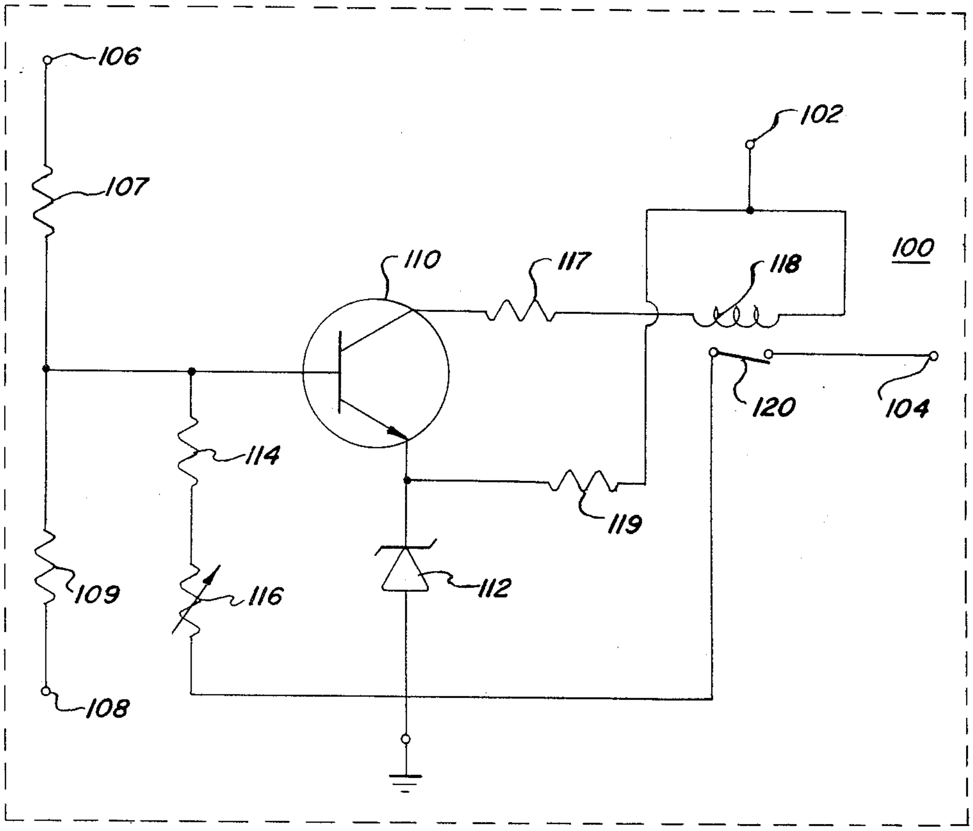
FIG. 3 is a schematic diagram of a circuit which may optionally be added to the invention shown in FIG. 2.

As will be described in detail below in connection with FIG. 2, the switches 22 and 28 of the line test isolation apparatus 10, in the preferred embodiment, will open if a 75 volt test voltage is applied to the conductor 34 from the central office equipment 14 for a preselected time duration, e.g., 30 seconds. This voltage may be applied either over subscriber cable 18 as shown in FIG. 1 or may alternatively be applied over subscriber cable 20. The signal magnitude sensing circuit 36 is designed to protect the line test isolation apparatus 10 from being accidentally actuated by other voltages present throughout a telephone system. For example, if a voltage of less than the predetermined test signal voltage of 75 volts is transmitted to the line test isolation apparatus 10, the signal magnitude sensing circuit will ensure that the isolating switch circuit 16 is not actuated. The signal duration sensing circuit 38 is similarly designed to protect the line test isolation apparatus 10 from being accidentally actuated by extraneous signals of short time duration. Similarly, circuitry can be provided which will make the line test isolation apparatus immune from voltages of substantially higher than the test signal voltage. One such circuit is shown in FIG. 3.

When the switches 22 and 28 are actuated, the test voltage on the conductor 34, the switches open to contacts 24 and 26, respectively. With the switches 22 and 28 in this condition, the subscriber equipment 12 is disconnected from the central office equipment 14 and an open circuit is presented to the central office equipment 14 for test purposes. If it is desired, a short circuit or a fixed resistance may also be connected across the terminals 24 and 26, thereby providing an alternative termination for the cable pair. The choice of type of cable termination is up to the individual user and it will be recognized by one skilled in the art that either an open circuit, a short circuit, of a fixed resistance termination may be used without departing from the spirit and the scope of the invention.

The switch closing circuit 32 is adapted to automatically return the switches 22 and 28 to their normally closed position after a preselected time interval. In the preferred embodiemnt, this preselected time interval is 60 seconds; however, any other time interval may be employed. A time interval of 60 seconds normally allows ample time for the test man to perform the necessary tests after which it is desirable for the line test isolation apparatus 10 to revert to its normal condition and reconnect the subscriber equipment 12 to the central office equipment 14.

Now, referring to FIG. 2, the line test isolation apparatus 10 will be discussed in greater detail. The line test isolation apparatus 10 comprises an isolating switch circuit 16 which is connected between the central office equipment 14 and the subscriber equipment 12 by placing the switches 22 and 28 in series with the subscriber cables 18 and 20. As described in connection with FIG. 1, when the switches 22 and 28 are connected to the contacts 23 and 28, respectively, as shown in FIG. 2, a complete circuit is made over the subscriber cables 18 and 20 from the central office equipment 14 to the subscriber equipment 12. When the switches 22 and 28 are actuated from their normal condition, they complete a circuit with contacts 24 and 26, respectively. The actuation of these switches breaks the connection between the central office equipment 14 and the subscriber element 12, thereby isolating the subscriber equipment 12. As can be seen in FIG. 2, a resistor 40 may be provided between the contacts 24 and 26 and thus, when the switches 22 and 28 make contact with the contacts 24 and 26, the central office sees a fixed termination determined by the impedance of resistor 40. Resistor 40, as explained above, is optional and may be replaced by an open circuit or by a short circuit.

The actuation of the switches 22 and 28 is controlled by the isolating switch circuit 16 as well as the signal magnitude sensing circuit 36 and the signal duration sensing circuit 38. After being actuated, the switches 22 and 28 are returned to their normally closed position by the switch closing circuit 32. As explained above, a conductor 34 is provided to enable the test voltage from the central office to be transmitted via either the tip subscriber cable 18 or the ring subscriber cable 20 to the line test isolation apparatus 10. In FIG. 2, the conductor 34 is connected to the contact 23 which completes a path via the cable conductor 18 to the signal magnitude sensing circuit 36. It will be readily recognized that the conductor 34 could also have been connected to the contact 25 thereby alternatively providing a path for the test voltage signal via the ring subscriber cable 20 to the signal magnitude sensing circuit 36.

The signal magnitude sensing circuit 36 essentially comprises a normally off transistor 48 and a normally on transistor 52. A plurality of resistors 42, 44 and 46 provide a biasing path for the transistor 48 to enable the transistor 48 to be made conductive when a current flows through the resistors 42, 44 and 46. Two controlled rectifiers 54 and 56 form a circuit whereby when the transistor 48 becomes conductive, the normally conductive transistor 52 becomes non-conductive. When the transistor 52 becomes non-conductive, a capacitor 60 within the signal duration sensing circuit 38 begins to charge and when charged sufficiently, it causes a unijunction transistor 62 to transmit a pulse which actuates a controlled rectifier 64 in the isolating switch circuit 16. The actuation of the controlled rectifier 64 in turn completes a current path through a relay winding 66. The relay winding 66, when energized, actuates the switches 22 and 28, as well as a switch 68, thus disconnecting the subscriber equipment 12 from the central office equipment 14. While only one relay winding 66 has been shown, it will be recognized by one skilled in the art that a plurality of relay windings controlling a plurality of switch contacts may be placed in parallel with the relay winding 66. These additional switch contacts may be used for other testing purposes.

The closing of the switch 68 causes current to flow to the switch closing circuit 32 and this eventually causes a unijunction transistor 72 to generate a pulse. The generation of this pulse causes a normally off transistor 74 is to be turned on and the turning on of the transistor 74 short-circuits a capacitor 76 which is electrically connected across the controlled rectifier 64. The shorting of the capacitor 76 causes the controlled rectifier 64 to become non-conductive, thereby de-energizing the relay winding 66 and causing the switches 22 and 28 to return to their normally closed positions reconnecting the subscriber equipment 12 to the central office equipment 14. The de-energization of the relay winding 66 also causes the switch 68 to open, thereby deactivating the switch closing circuit 32, thus returning the line test isolation apparatus 10 to its initial state.

Referring again to FIG. 2, when the test signal source 15 transmits a test voltage, for example 75 volts from tip to ground, along the conductor 34, current flows through the resistors 42, 44 and 46, thus causing the transistor 48 to turn on. When the transistor 48 turns on, the collector voltage of the transistor 48 is lowered to the voltage of the controlled rectifier 54 which in the preferred embodiment comprises a zener diode. This voltage is lower than the voltage of the controlled rectifier 56 which is also a zener diode and, therefore, the base to emitter voltage of the transistor 52 is zero and thus, the transistor 52 is turned off. The turning off of the transistor 52 effectively removes from the circuit resistor 58 which is across the capacitor 60 thus, allowing the capacitor 60 to slowly charge through resistors 78 and 80. After a predetermined time, such as 30 seconds, the voltage on the capacitor 60 has risen sufficiently so that the transistor 62 fires cuusing a pulse to appear across a resistor 82. The time period may be adjustable and this is determined by the impedances of the resistors 78 and 80 as well as the capacitor 60. If a signal of short duration present on the conductor 34, the capacitor 60 would not have sufficient time to charge and transistor 62 would, therefore, not fire.

The pulse from the transistor 62 passes through a DC blocking capacitor 84 and into the gate of the controlled rectifier 64, thus causing the controlled rectifier 64 to conduct. The conduction of the controlled rectifier 64 causes a current to flow through the relay windings 66, operating the switches 22, 28 and 68, and thus performing the switching operation as described previously. The closing of the switch 68 energizes the switch closing circuit 32. A current flows through resistors 84 and 86 to a capacitor 88. This causes the voltage on the capacitor 88 to rise slowly. After a predetermined time interval, for example 60 seconds, the voltage on the capacitor 88 has risen sufficiently to cause the transistor 72 to fire, thus causing a pulse to appear across resistor 90. This pulse momentarily turns on the transistor 74 which then shorts out the capacitor 76 thereby turning off the controlled rectifier 64. The turning off of the controlled rectifier 64 restores the switches 22, 28 and 68 to their normal positions as shown in FIG. 2.

It will be recognized by one skilled in the art that the time interval determined by the signal duration sensing circuit 38 and the switch closing circuit 32 is solely determined by the impedances of the circuit and may be set for any preselected value through the adjusting of the variable resistors 80 and 86. It will also be recognized that the signal magnitude sensing circuit may be adjusted to become sensitive to any preselected input voltage. The voltage to which the circuit is sensitive is determined by the breakdown voltage of the controlled rectifiers 54 and 56, as well as the impedance of the resistors 42, 44 and 46.

In the preferred embodiment, the signal magnitude sensing circuit 36 prevents the actuation of the isolating switch circuit 16 by positive voltages lower than 70 volts DC and all negative voltages. The adjustable resistor 46 is set so that for any applied voltage which is less than approximately 70 volts, the voltage drop across the combination of resistors 44 and 46 will be less than the zener voltage of the controlled rectifier 54 and thus, the transistor 48 will not turn on. Since transistor 48 is an NPN transistor in the preferred embodiment, it cannot be turned on by any negative voltage applied to its base and, therefore, the signal magnitude sensing circuit 36 is immune to all negative voltages. Furthermore, it is also immune to AC voltages since the resistor 58 is placed across the capacitors 60 whenever the applied voltage is less than 70 volts and this short circuit will occur during each cycle on the AC voltage, thus preventing the capacitor 60 from accumulating sufficient voltage to fire the transistor 62.

Lastly, it is also possible to make the line test isolation apparatus immune from voltage greater than 75 volts. This may be accomplished by utilizing an optional guard circuit 100 such as that shown in FIG. 3. It will be recognized by one skilled in the art that if a test voltage of 150 volts were to be employed, rather than 75 volts, there would be no need at all to employ the guard circuit 100, since voltages in a telephone circuit never exceed 150 volts.

Now referring to FIG. 3, the guard circuit 100 will be explained. The guard circuit 100 is connected to the line test isolation apparatus at the points 102, 104, 106 and 108, shown on FIG. 2. The circuitry of the guard circuit 100 is similar to the circuitry of the signal magnitude sensing circuit 36. Basically, it comprises a transistor 110 and a controlled rectifier 112, as well as associated biasing circuitry. The transistor 110 is normally in its off condition. Any voltage greater than 80 volts will cause a voltage across the combination of the resistor 114 and 116. When this voltage is greater than the voltage of the controlled rectifier 112, the transistor 110 will be turned on, thus causing current to flow through a relay winding 118. When relay winding 118 is energized, a switch 120 is closed. This inserts the resistor 58 (FIG. 2) across the capacitor 60, thus causing the capacitor 60 to discharge and remain discharged so long as the voltage applied at the point 106 is greater than 80 volts and, therefore, the guard circuit makes the line test isolation apparatus immune to voltages above 80 volts.

Thus, in summary, the line test isolation apparatus 10 may be utilized to disconnect a subscriber equipment 12 from its associated central office equipment 14 merely by providing a test signal of a preselected magnitude from the central office equipment over either of the subscriber cables towards the subscriber equipment. The line test isolation apparatus 10 will then disconnect the subscriber equipment and itself for a preselected amount of time and then automatically reconnect the equipment, thus enabling the test man to perform whatever test there is required and restoring service immediately.

One embodiment of a line test isolation apparatus 10 which meets the above requirements and is responsive to a 75 volt test signal, contains the following exemplary components; however, it is to be recognized that these components are merely illustrative of the invention and various modifications may be made without departing from the spirit and the scope of the invention. Furthermore, it will be recognized that other test voltages such as 150 volts may be utilized by merely adjusting the values of the components:

| Element | Value |
|---|---|
| 42 | 470K Ohm |
| 43 | 470K Ohm |
| 44 | 150K Ohm |
| 46 | 180K Ohm |
| 47 | 10K Ohm |
| 49 | 10K Ohm |
| 51 | 1K Ohm |
| 58 | 100 Ohm |
| 78 | 180K Ohm |
| 80 | 180K Ohm |
| 81 | 1K Ohm |
| 82 | 27 Ohm |
| 83 | 100 Ohm |
| 85 | 1K Ohm |
| 90 | 27 Ohm |
| 84 | 390K Ohm |
| 86 | 180K Ohm |
| 107 | 470K Ohm |
| 109 | 470K Ohm |
| 114 | 75K Ohm |
| 116 | 180K Ohm |
| 117 | 1.2K Ohm |
| 119 | 10K Ohm |
| 60 | 100 mf at 25 V. |
| 84 | 0.022 mf at 5 V. |
| 76 | 0.1 mf at 35 V. |
| 88 | 100 mf at 25 V. |
| 54 | VR 20 |
| 56 | VR 24 |
| 64 | SCR C106A1 |
| 112 | VR 20 |
| 48 | 2N2712 |
| 52 | 2N2712 |
| 62 | 2N2646 |
| 74 | 2N2712 |
| 72 | 2N2646 |
| 110 | 2N2712 |

It should be understood, of course, that the foregoing disclosure relates only to a preferred embodiment of the invention and that numerous modifications or alterations may be made therein without departing from the spirit and the scope of the invention as set forth in the appended claims.

The embodiments of the invention in which an exclusive property or privilege is claimed are defined as follows:

1. An apparatus located at a subscriber equipment installation for remotely disconnecting the subscriber equipment from the subscriber line and its associated central office equipment comprising:

means for remotely applying a first signal of preselected magnitude from said central office to said apparatus;

normally closed switch means connected in said subscriber line between said subscriber equipment and said central office equipment;

circuit means located between said switch means and said subscriber equipment for sensing the magnitude of said first signal, whereby said circuit means is adapted to open said normally closed switch means thereby disconnecting said subscriber equipment from said subscriber line, when said signal is of a preselected magnitude; and means for automatically closing said switch means after a preselected time interval thereby reconnecting said subscriber equipment to said central office equipment.

2. The apparatus of claim 1 wherein said circuit means further comprises a time delay means wherein said normally closed switch means is opened when said first signal has a preselected time duration.

3. The apparatus of claim 2 wherein said circuit means is adapted to open said normally closed switch means solely in response to said first signal of said preselected magnitude and is non-responsive to signals of other magnitudes.

4. The apparatus of claim 1 wherein said circuit means comprises:

a first solid state switching means responsive to said first signal wherein said first solid state switching means generates a second signal when said first signal is of a preselected magnitude;

a first pulsing circuit means responsive to said second signal wherein said first pulsing circuit means generates a first pulse signal when said first signal is of preselected magnitude and a preselected time duration;

a second normally non-conductive solid state switching means responsive to said first pulse signal; and a relay winding means connected to said second solid state switching means wherein said first pulse signal causes said second solid state switch means to conduct thereby energizing said relay winding means and wherein said energized relay winding means causes said normally closed switch means to open.

5. The apparatus of claim 4 further comprising a second pulsing circuit wherein said second pulsing circuit causes said relay windings to de-energize after a preselected time interval.

* * * * *